United States Patent
Barton et al.

(10) Patent No.: US 12,082,227 B2
(45) Date of Patent: *Sep. 3, 2024

(54) TIME SENSITIVE NETWORKING (TSN) IN WIRELESS ENVIRONMENTS

(71) Applicant: Cisco Technology, Inc., San Jose, CA (US)

(72) Inventors: Robert E. Barton, Richmond (CA); Maik Guenter Seewald, Nuremberg (DE); Pascal Thubert, Roquefort les Pins (FR); Jerome Henry, Pittsboro, NC (US)

(73) Assignee: Cisco Technology, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 17/395,796

(22) Filed: Aug. 6, 2021

(65) Prior Publication Data

US 2021/0368522 A1 Nov. 25, 2021

Related U.S. Application Data

(63) Continuation of application No. 16/575,672, filed on Sep. 19, 2019, now Pat. No. 11,096,196.

(51) Int. Cl.
*H04W 72/50* (2023.01)
*H04W 84/12* (2009.01)

(52) U.S. Cl.
CPC .......... *H04W 72/535* (2023.01); *H04W 84/12* (2013.01)

(58) Field of Classification Search
CPC ... H04W 72/1257; H04W 84/12; H04W 4/70; H04W 28/16; H04W 72/535
See application file for complete search history.

(56) References Cited

U.S. PATENT DOCUMENTS

| | | | |
|---|---|---|---|
| 9,319,332 B2 | 4/2016 | Thubert et al. | |
| 2005/0210157 A1* | 9/2005 | Sakoda | H04W 74/0816 709/251 |
| 2018/0049242 A1* | 2/2018 | Viger | H04W 72/0453 |
| 2018/0132234 A1 | 5/2018 | Cavalcanti et al. | |
| 2018/0160424 A1 | 6/2018 | Cavalcanti et al. | |
| 2018/0184438 A1 | 6/2018 | Cavalcanti et al. | |
| 2018/0227768 A1* | 8/2018 | Samdanis | H04W 28/24 |
| 2018/0234854 A1* | 8/2018 | Zhang | H04L 5/26 |
| 2019/0332918 A1* | 10/2019 | Gómez Gutiérrez | G06N 3/084 |
| 2020/0053706 A1* | 2/2020 | Sadeghi | H04W 72/044 |
| 2020/0229243 A1* | 7/2020 | Jiang | H04W 52/367 |

(Continued)

OTHER PUBLICATIONS

Talebi Fard et al., "Device Configuration for Time Sensitive Network Bridge", the U.S. Appl. No. 62/806,185, filed Feb. 15, 2019 (Year: 2019) (Year: 2019).*

(Continued)

*Primary Examiner* — Thinh D Tran
(74) *Attorney, Agent, or Firm* — Merchant & Gould P.C.

(57) ABSTRACT

Time Sensitive Networking (TSN) in wireless environments may be provided. First, a Radio Frequency (RF) profile associated with a station may be received by a computing device. Next, a number of Transmit Opportunities (TxOPs) to use for transmitting data between an Access Point (AP) and the station based on the received RF profile may be determined. The determined number of TxOPs may then be provided to a wireless controller associated with the AP.

20 Claims, 3 Drawing Sheets

(56) References Cited

U.S. PATENT DOCUMENTS

2020/0267785 A1* 8/2020 Talebi Fard ........ H04W 40/248
2021/0075697 A1* 3/2021 Dattagupta ......... H04L 41/5019

OTHER PUBLICATIONS

Bartelt, J. et al., 5G transport network requirements for the next generation fronthaul interface (EURASIP Journal on Wireless Communications and Networking) (2017) 2017:89, May 15, 2017, DOI 10.1186/s13638-017 (12 pgs.).

Talebi Fard et al., "Device Configuration for Time Sensitive Network Bridge", the U.S. Appl. No. 62/806,185, filed Feb. 15, 2019 (Year: 2019).

* cited by examiner

TIME SENSITIVE NETWORKING (TSN) IN WIRELESS ENVIRONMENTS

RELATED APPLICATION

This application is a continuation of co-pending U.S. patent application Ser. No. 16/575,672, filed on Sep. 19, 2019, the disclosure of which is incorporated herein by reference, in its entirety.

TECHNICAL FIELD

The present disclosure relates generally to wireless time sensitive networking.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices to one wired connection. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
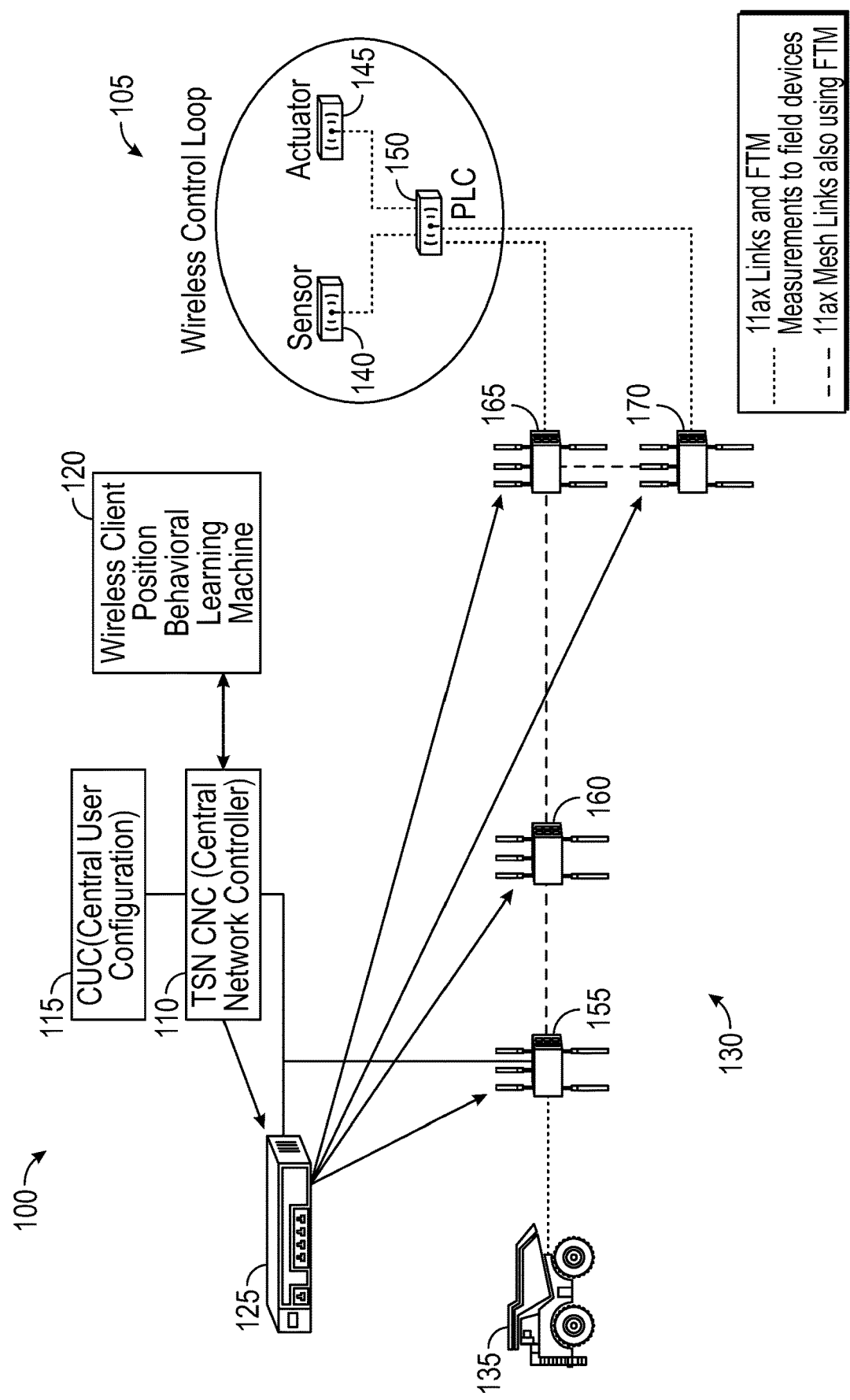
FIG. 1 is a block diagram of an operating environment.

Time Sensitive Networking (TSN) in wireless environments may be provided. First, a Radio Frequency (RF) profile associated with a station may be received by a computing device. Next, a number of Transmit Opportunities (TxOPs) to use for transmitting data between an Access Point (AP) and the station based on the received RF profile may be determined. The determined number of TxOPs may then be provided to a wireless controller associated with the AP.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Time Sensitive Networking (TSN) is a set of Institute of Electrical and Electronic Engineers (IEEE) 802 Ethernet sub-standards that are defined by the IEEE TSN task group. These standards enable deterministic real-time communication over Ethernet. TSN achieves determinism over Ethernet by using time synchronization and a schedule which is shared between network components. By defining queues based on time, Time-Sensitive Networking ensures a bounded maximum latency for scheduled traffic through switched networks. This means that in a TSN network, latency of critical scheduled communication may be guaranteed.

In control applications with strict deterministic requirements, such as those found in automotive and industrial domains, TSN may offer a way to send time-critical traffic over a standard Ethernet infrastructure. This may enable the convergence of all traffic classes and multiple applications in one network. In practice this may mean that the functionality of standard Ethernet may be extended so that message latency may be guaranteed through switched networks, critical and non-critical traffic may be converged in one network, and higher layer protocols can share the network infrastructure.

Wireless Local Area Networks (WLANs) compatible with the 802.11ac specification standard, for example, may support contention-based access processes such as Carrier-Sense Multiple Access With Collision Avoidance (CSMA/CA) to provide media access to stations. When using, for example, CSMA/CA to provide media access, as soon as a station is ready to send a packet, it checks to be sure the channel is clear (i.e., no other client device is transmitting at the time). The station (and also for the AP in CSMA/CA mode) picks up a random number, waits for the channel to be clear/silent for a specific amount of time (i.e., Arbitrated Interframe Space (AIFS)), then counts down from the random number until it reaches zero. At any point of the count down, if another station is detected sending, the station waits for the channel to be clear for an AIFS after the other transmission is completed, then resumes its count down from where it stopped. When the countdown reaches zero and the channel is clear, the station sends. This is the Network Allocation Vector (NAV), counted down with the backoff timer (which may comprise a counter). If the channel is clear when the backoff counter reaches zero, the client device transmits the packet. If the channel is not clear when the backoff counter reaches zero (e.g., when the count reaches zero, another station happens to start sending), then the station waits for the transmission to complete, then waits an AIFS, then observes that its countdown is zero and therefore sends without waiting further, the backoff factor is set again, and the process is repeated.

WLANs compatible with the 802.11ax specification standard, for example, may support Orthogonal Frequency-Division Multiple Access (OFDMA) technology to provide media access to stations (i.e., client devices). When using OFDMA to provide media access, an Access Point (AP) may partition a channel into smaller sub-channels know as Transmit Opportunities (TxOPs) (i.e., Resource Units (RUs)) so that simultaneous multiple-user transmissions may occur. The AP may determine the RU allocation for multiple stations for both downlink and uplink OFDMA. In other words, the AP may determine how RUs may be assigned to stations within a given channel. The stations may provide feedback to 802.11ax compatible APs using, for example, solicited or unsolicited buffer status reports, however, the AP may make the decision in regards to RU allocation for synchronized UL-OFDMA from multiple client devices.

Establishing TSN in wireless (e.g., Wi-Fi) environments may be complex, in part because contention-based access processes rely on initial random timers. This issue is partially solved with 802.11ax, where OFDMA schedulers may allocate TxOPs (i.e., RUs) to individual stations. This may work well in indoor environments, where stations are relatively stationary at the scale of the scheduling period. This opens the possibility of using Wi-Fi 6/802.11ax as an alternative to conventional deterministic wireless technologies, such as Wireless Highway Addressable Remote Transducer Protocol (HART) and ISA100.11a.

In complex environments, however, the model becomes challenged and OFDMA alone may not meet the time sensitive needs of most TSN applications. For example, in open mines, trucks (i.e., stations) may need TSN data exchanges for real time automated driving functions. The amount of data that is to be exchanged may be known and predictable. The truck, however, may be moving (although on a predictable track) and the Radio Frequency (RF) signal may be constantly changing. In such an environment, a "late condition" may appear, where a TSN controller instructs an AP OFDMA scheduler to allocate RUs based on the truck's current data rate, but the truck moves and fails to obtain the bandwidth it really needed for the current data burst.

When the truck is approaching the AP, or moving to a region of low RF variability, this may result in wasted bandwidth. In other words, the truck may have finished transmitting the useful information before the end of the allocated schedule, and ends up sending empty padding to complete the schedule. When the truck is moving away from the AP, or through a region of high RF variability (e.g., destructive interference, or other metallic objects on the path causing large signal stochasticity), this may result in data lost (not transmitted), which may be problematic.

While wireless (e.g., Wi-Fi) may be an accessible solution, the same challenge mentioned above may be experience by a host of other TSN applications where RF conditions may vary. Accordingly, there may be a need for a process that may inform the wireless scheduler, not only about the station's current RF location, but also about its predicted location and RF condition changes over the course of the next scheduled interval.

FIG. 1 shows an operating environment 100. As shown in FIG. 1, operating environment 100 may comprise a wireless control loop 105, a TSN Central Network Controller (CNC) 110, a Central User Configuration (CUC) 115, a wireless client position behavioral leaning model 120, a wireless controller 125, a plurality of Access Points (APs) 130, and a station 135. Wireless control loop 105 may comprise a sensor 140, an actuator 145, and a Programmable Logic Controller (PLC) 150. Plurality of APs 130 may comprise a first AP 155, a second AP 160, a third AP 165, and a fourth AP 170. Wireless control loop 105 may be used in operating environment 100 to provide control features to TSN traffic in a wireless network (i.e., a WLAN) comprising plurality of APs 130 for example.

CUC 115 may take requirements from end-devices (e.g., station 135) or may detect transmission availability based on sensor data. Once the required communication relations between sending devices (i.e., talkers) and receiving devices (i.e., listeners) has been established, that information may be transferred to TSN CNC 110, that may have full and global knowledge of network resources and topology. TSN CNC 110 may then use this information to find a path that fits the communication requirements between talker and listener. This path may be subsequently configured as the transmission path for a stream between the devices. As will be described in greater detail below, TSN CNC 110 may pass scheduling information (e.g., OFDMA scheduling information) to wireless controller 125.

Wireless controller 125 may communicate with TSN CNC 110 and control the wireless network (i.e., the WLAN) comprising plurality of APs 130 for example. In other words, wireless controller 125 may schedule TSN transmissions in the wireless network comprising plurality of APs 130. OFDMA technology may be used by wireless controller 125 on each of plurality of APs 130 to provide media access to client devices such as station 135. As stated above, when using OFDMA to provide media access, each of plurality of APs 130 may partition a channel into smaller sub-channels (e.g., TxOPs or RUs). Each of plurality of APs 130 may determine the RU allocation for multiple client devices for both downlink and uplink OFDMA. In other words, each of plurality of APs 130 may determine how RUs may be assigned to client devices (e.g., station 135) within a given channel. The client devices may provide feedback to 802.11ax compatible APs using, for example, solicited or unsolicited buffer status reports, however, plurality of APs 130 may make the decision in regards to RU allocation for synchronized UL-OFDMA from multiple client devices.

Station 135 may be associated with and may be used to control a device in motion, for example, a mining haul truck that makes spiral trips or a robot in a factory. Station 135 may comprise, but is not limited to, a smart phone, a personal computer, a tablet device, a mobile device, a cable modem, a remote control device, a set-top box, a digital video recorder, an Internet-of-Things (IoT) device, a network computer, a mainframe, a router, or other similar microcomputer-based device.

Embodiments of the disclosure may provide a process to maintain Reliable and Available Wireless (RAW) properties for a wireless station (e.g., station 135) that may move along a well-known circuit, for instance a mining haul truck that makes spiral trips or a robot in a factory for example. RAW properties and mobility may be antagonistic goals and may be difficult to obtain together. To address this problem, embodiments of the disclosure may divide the well-known circuit that the wireless station (e.g., station 135) may move along into logical segments and may assign different Traffic Engineering (TE) properties depending on the segment where the wireless station is at any point of time. This may mean different wireless settings per segment. For example, embodiments of the disclosure may allow the OFDMA schedule to proactively allocate TxOPs (e.g., RUs) based on the expected needs of the moving station for each particular segment, orchestrated from TSN CNC 110 for example.

To determine the segment, embodiments of the disclosure may leverage Fine Timing Measurement (FTM) (which may be defined in 802.11-2016) to perform ranging to and from a station. On-channel FTM exchanges may be instantiated that may record a station's distance to an AP (e.g., in units of distance). The AP may record the result of each ranging sample and the station signal level (e.g., Received Signal Strength Indicator (RSSI)) for associated frames. The FTM data may be collected and forwarded to wireless client position behavioral leaning model 120, for example, in a fog or cloud environment.

As the station moves, wireless client position behavioral leaning model 120 may build a distance versus stochasticity map or database. The map or database may indicate, for each unit of distance to the AP, the stochasticity of the signal (i.e., the RF instability). As wireless client position behavioral leaning model 120 learns, the paths, speeds, and stochasticity are learned. Wireless client position behavioral leaning model 120 models for each location the likely displacement over the next interval (i.e., the likely distance traveled, to or from the AP), along with the likely stochasticity of the signal, making both position and time of flight predictable. TSN CNC 110 may communicate with wireless client position behavioral leaning model 120. This process may allow the TSN CNC 110 to account for the expected change in the RF conditions, and instruct an OFDMA scheduler in wireless controller 125 accordingly.

The elements described above of operating environment 100 (e.g., elements of wireless control loop 105, TSN CNC 110, CUC 115, wireless client position behavioral leaning model 120, wireless controller 125, plurality of APs 130, and station 135) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment 100 may be practiced in a computing device 300.

Figure 2:
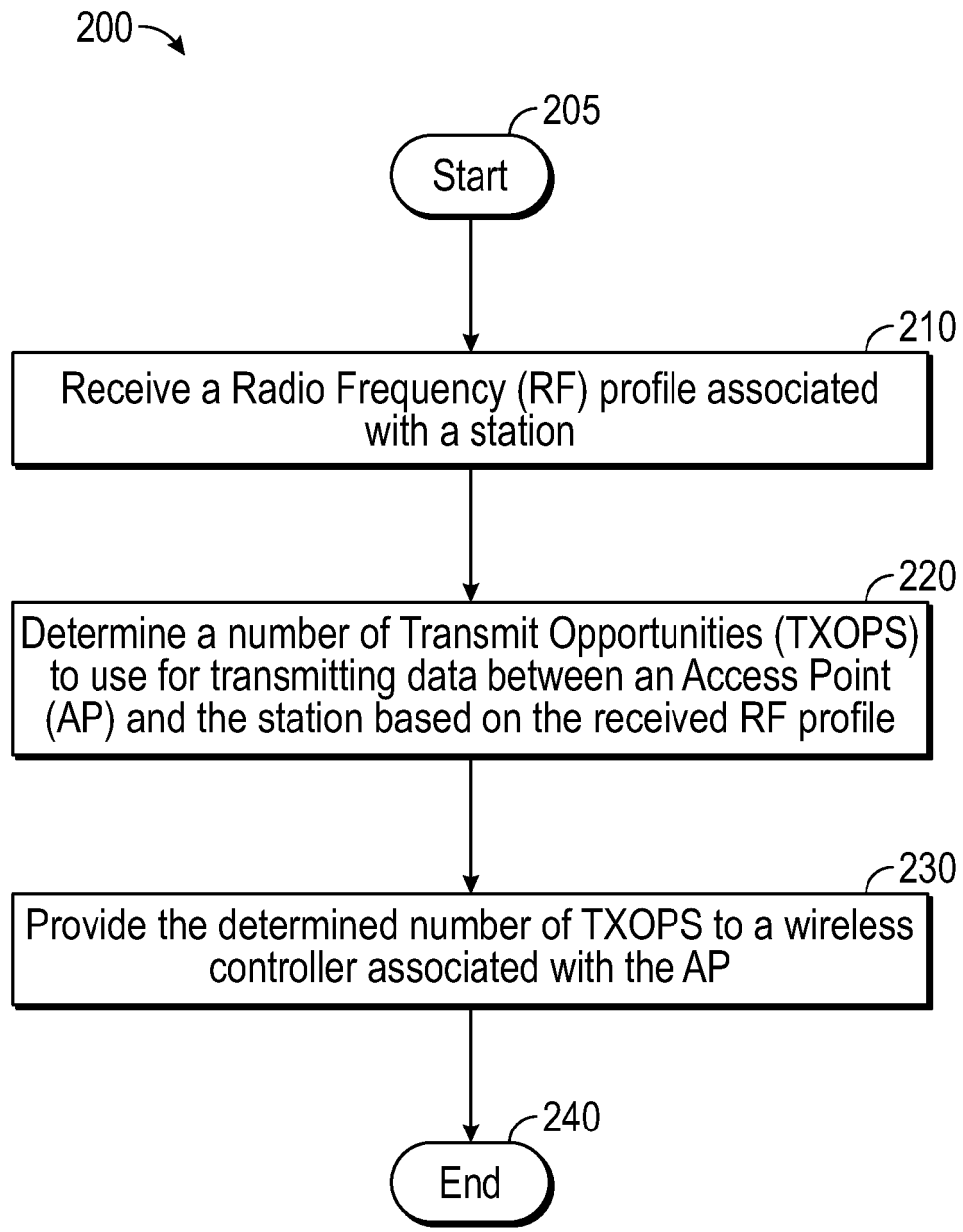
FIG. 2 is a flow chart of a method for providing Time Sensitive Networking (TSN) in wireless environments.

FIG. 2 is a flow chart setting forth the general stages involved in a method 200 consistent with embodiments of the disclosure for providing Time Sensitive Networking (TSN) in wireless environments. Method 200 may be implemented using TSN CNC 110 that may be embodied by a computing device 300 as described in more detail below with respect to FIG. 3. Ways to implement the stages of method 200 will be described in greater detail below.

Method 200 may begin at starting block 205 and proceed to stage 210 where TSN CNC 110 may receive a Radio Frequency (RF) profile associated with a station (e.g., station 135). For example, first AP 155 may send a message to station 135. In response, station 135 may provide the RF profile that reports the stochasticity of RF signals (i.e., the RF instability) in the area station 135 is currently in. For example, station 135 may report to first AP 155 several data points of RSSIs received from first AP 155 as the RF profile.

TSN CNC 110 may receive these data points, use regression analysis on them, and determine a slope. If the slope is negative, then this may mean that station 135 is moving away from first AP 155. If the slope is positive, then this may mean that station 135 is moving toward first AP 155. If the slope is steep, this may mean that the stochasticity is changing quickly. If the slope relatively flat, this may mean that the stochasticity is not changing quickly.

From stage 210, where TSN CNC 110 may receive the RF profile associated with station 135, method 200 may advance to stage 220 where TSN CNC 110 may determine a number of Transmit Opportunities (TxOPs) to use for transmitting data between first AP 155 and station 135 based on the received RF profile. For example, behavioral leaning model 120 may be built as described above. TSN CNC 110 may provide the received RF profile to behavioral leaning model 120. In response to the provided RF profile, behavioral leaning model 120 may provide a predicted stochasticity of the RF environment that station 135 may be moving to during the next scheduled data interval that TSN CNC 110 needs to send data to station 135. Based on the predicted stochasticity of the RF environment that station 135 may be moving to, a data rate may be determined that may be supported by operating environment 100 during the next scheduled data interval that TSN CNC 110 needs to send data to station 135. TSN CNC 110 may know how much data that needs to be transmitted over the next scheduled data interval, and now that it may also know the data rate that may be supported by operating environment 100 during the next scheduled data interval, TSN CNC 110 may determine the number of TxOPs (e.g., RUs) that may need to be allocated for the next scheduled data interval.

Once TSN CNC 110 determines the number of TxOPs to use for transmitting data between first AP 155 and station 135 based on the received RF profile in stage 220, method 200 may continue to stage 230 where TSN CNC 110 may provide the determined number of TxOPs to wireless controller 125 associated with first AP 155. For example, a scheduler in wireless controller 125 may schedule the next data interval for the transmission between first AP 155 and station 135 according to the number of TxOPs determined by TSN CNC 310. Once TSN CNC 110 provides the determined number of TxOPs to wireless controller 125 associated with first AP 155 in stage 230, method 200 may then end at stage 240.

The scheduler in wireless controller 125 may manage multiple stations and each station may need to send and/or receive a variety of flows, for example, live guidance for self-driving, sensor updates, and results of outside computations for other object's positions. Some data may be time sensitive and may include send or drop logic, for example, Voice over Internet Protocol (VoIP) traffic to a control tower (e.g., policing). Other traffic may have more balance (e.g., instruction X to turn 2 degrees east to avoid a rock may have 6 ms to reach a truck). Consequently, the scheduler may adapt the additional margin instruction based on station and traffic type.

In addition, fading may occur at cell boundaries, and may comprise the main cause of stochasticity. Embodiments of the disclosure may schedule the sequence of activities during roaming, first normal transmission with first AP 155, then more Forward Error Correction (FEC), then roaming, then more FEC with second AP 160, then normal transmission with second AP 160. Communication devices in vehicles may be equipped with two radios in order to roam proactively. The roaming process described above may become a period of time where both radios are active and the controller duplicated the packets, one copy to be transmitted to/from a vehicle via each AP.

Furthermore, behavioral leaning model 120 may learn when to play a particular sequence, but the exact time may change with each round trip since the truck may not always go at the exact same speed (e.g., human operator case). Embodiments of the disclosure may use radio based location (e.g., FTM) to locate the position of a station and may trigger the schedule as described above.

Figure 3:
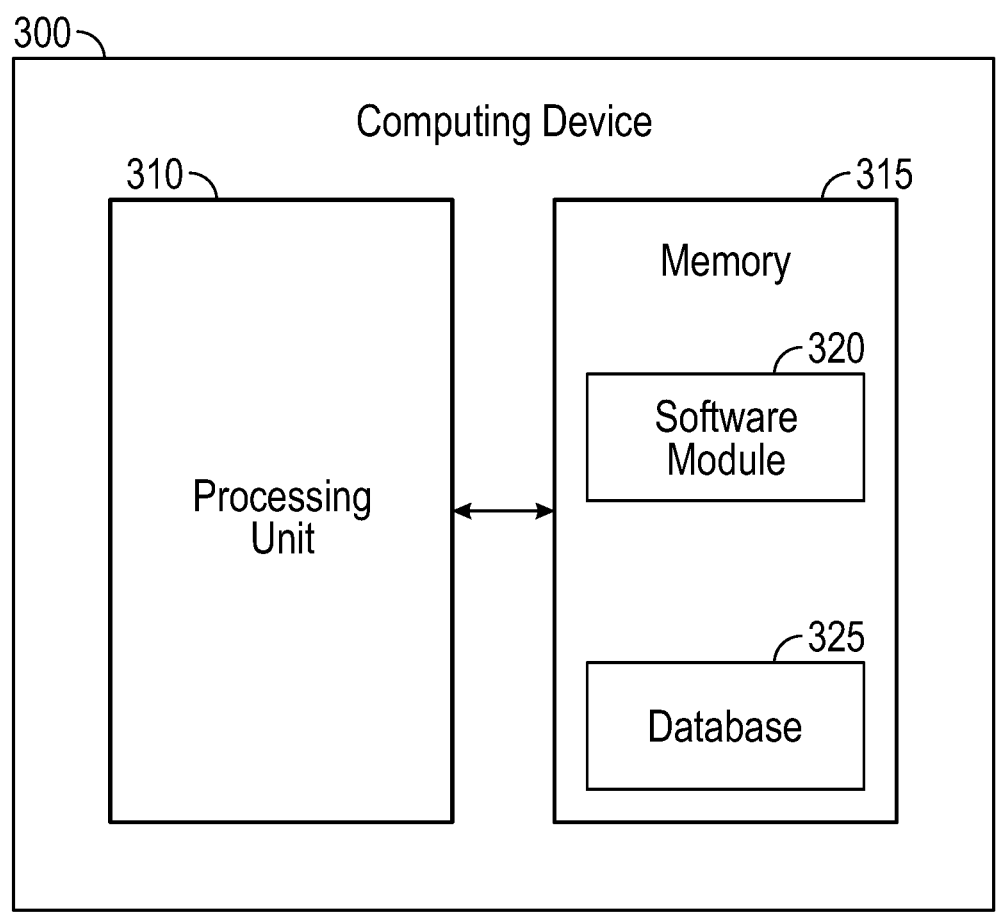
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing Time Sensitive Networking (TSN) in wireless environments as described above with respect to FIG. 2. Computing device 300, for example, may provide an operating environment for elements of wireless control loop 105, TSN CNC 110, CUC 115, wireless client position behavioral leaning model 120, wireless controller 125, plurality of APs 130, and station 135. Elements of wireless control loop 105, TSN CNC 110, CUC 115, wireless client position behavioral leaning model 120, wireless controller 125, plurality of APs 130, and station 135 may operate in other environments and are not limited to computing device 300.

Computing device 300 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the elements illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, by a computing device, a Radio Frequency (RF) profile associated with a station;
   determining a number of Transmit Opportunities (TxOPs) to use for transmitting data between an Access Point (AP) and the station based on the received RF profile, wherein determining the number of TxOPs comprises determining the number of TxOPs based on an amount of data to be transmitted to the station during a next transmit period and a predicted stochasticity of a signal from the station during the next time period, the predicted stochasticity determined based on a mapping of past movements of the station and a stochasticity of a signal at different points in the past movements; and
   providing the determined number of TxOPs to a wireless controller associated with the AP.

2. The method of claim 1, wherein receiving the RF profile associated with the station comprises receiving the RF profile associated with the station that is in motion.

3. The method of claim 1, wherein receiving by the computing device comprises receiving by the computing device comprising a Time Sensitive Networking (TSN) controller.

4. The method of claim 1, wherein the predicted stochasticity of the signal from the station is determined from a position behavioral model comprising a mapping of past movements of the station and a stochasticity of the signal received from the station at different points in the past movements, and wherein the position behavioral model provides, for each location of the station, a likely displacement over the next transmit period.

5. The method of claim 1, wherein determining the number of TxOPs further comprises determining the number of TxOPs that will cause the amount of data to be transmitted to the station during the next transmit period to be completely transmitted during the next transmit period at a data rate and bandwidth supported by the RF profile.

6. The method of claim 1, wherein determining the number of TxOPs further comprises determining the number of TxOPs based on a direction of movement of the station.

7. The method of claim 6, wherein the direction of movement of the station is determined based on a derivative of a Received Signal Strength Indicator received from the station.

8. A system comprising:
   a memory storage; and
   a processing unit coupled to the memory storage, wherein the processing unit is operative to:
   receive a Radio Frequency (RF) profile associated with a station;
   determine a number of Transmit Opportunities (TxOPs) to use for transmitting data between an Access Point (AP) and the station based on the received RF profile, wherein determining the number of TxOPs comprises determining the number of TxOPs based on a direction of movement of the station, wherein determining the number of TxOPs based on the direction of movement of the station comprises determining a predicted stochasticity of a signal from the station during a next transmit period, the predicted stochasticity determined based on a mapping of past movements of the station and a stochasticity of a signal at different points in the past movements; and
   provide the determined number of TxOPs to a wireless controller associated with the AP.

9. The system of claim 8, wherein the processing unit being operative to receive the RF profile associated with the station comprises the processing unit being operative to receive the RF profile associated with the station that is in motion.

10. The system of claim 8, wherein the processing unit is disposed in a Time Sensitive Networking (TSN) controller.

11. The system of claim 8, wherein the processing unit is further operative to determine the direction of the station based on a derivative of a Received Signal Strength Indicator received from the station.

12. The system of claim 8, wherein the predicted stochasticity of the signal from the station is determined from a position behavioral model comprising a mapping of past movements of the station and a stochasticity of the signal received from the station at different points in the past movements, and wherein the position behavioral model provides, for each location of the station, a likely displacement over the next transmit period.

13. The system of claim 8, wherein the processing unit being operative to determine the number of TxOPs further comprises the processing being operative to determine the number of TxOPs based on an amount of data to be transmitted to the station during the next transmit period.

14. The system of claim 13, wherein the processing unit being operative to determine the number of TxOPs further comprises the processing unit being operative to determine the number of TxOPs that will cause the amount of data to be transmitted to the station during the next transmit period to be completely transmitted during the next transmit period at a data rate and bandwidth supported by the RF profile.

15. A non-transitory computer-readable medium that stores a set of instructions which when executed performs a method comprising:
   receiving a Radio Frequency (RF) profile associated with a station;
   determining a number of Transmit Opportunities (TxOPs) to use for transmitting data between an Access Point (AP) and the station based on the received RF profile, wherein determining the number of TxOPs comprises determining the number of TxOPs that will cause an amount of data to be transmitted to the station during a next transmit period to be completely transmitted during the next transmit period at a data rate and bandwidth supported by the RF profile determined from a position behavioral model comprising a mapping of past movements of the station and a stochasticity of the signal received from the station at different points in the past movements; and
   providing the determined number of TxOPs to a wireless controller associated with the AP.

16. The non-transitory computer-readable medium of claim 15, wherein receiving the RF profile associated with the station comprises receiving the RF profile associated with the station that is in motion.

17. The non-transitory computer-readable medium of claim 15, wherein receiving by the computing device comprises receiving by the computing device comprising a Time Sensitive Networking (TSN) controller.

18. The non-transitory computer-readable medium of claim 15, wherein the number of TxOPs are determined further based on a direction of movement of the station.

19. The non-transitory computer-readable medium of claim 18, wherein the direction of movement the station is determined based on a derivative of a Received Signal Strength Indicator received from the station.

20. The non-transitory computer-readable medium of claim 15, wherein the position behavioral model further provides, for each location of the station, a likely displacement over the next transmit period.

* * * * *